United States Patent [19]
Umetsu

[11] Patent Number: 5,923,150
[45] Date of Patent: Jul. 13, 1999

[54] CHARGING APPARATUS

[75] Inventor: Koji Umetsu, Miyagi, Japan

[73] Assignee: Sony Corporation, Japan

[21] Appl. No.: 08/824,047

[22] Filed: Mar. 21, 1997

[30] Foreign Application Priority Data

Mar. 29, 1996 [JP] Japan ............................... P08-104079
Mar. 29, 1996 [JP] Japan ............................... P08-104080

[51] Int. Cl.⁶ .................................................... H02J 7/00
[52] U.S. Cl. .......................................... 320/162; 320/159
[58] Field of Search ..................................... 320/155, 156, 320/157, 158, 159, 162–163, 164, 128

[56] References Cited

U.S. PATENT DOCUMENTS 5,408,170  4/1995  Umetsu et al. .......................... 320/148
5,576,608  11/1996  Nagai et al. ............................ 320/159

Primary Examiner—Peter S. Wong
Assistant Examiner—Gregory J. Toatley, Jr.
Attorney, Agent, or Firm—Rader, Fishman& Grauer; Ronald P. Kananen

[57] ABSTRACT

A charging apparatus for controlling so as to charge a connected secondary battery by a constant current which is equal to or less than a constant voltage and to charge the secondary battery by a constant voltage which is equal to or less than the constant current when a terminal voltage of the secondary battery rises to the constant voltage is constructed by: switching means for shutting off a charge current at a certain period; comparing means for comparing a voltage difference between a first voltage on a power source side than the switching means when the charge current is shut off and a second voltage on the secondary battery side with a first reference voltage; and control means for stopping the charge or displaying the end of charge in accordance with the comparison result.

19 Claims, 10 Drawing Sheets

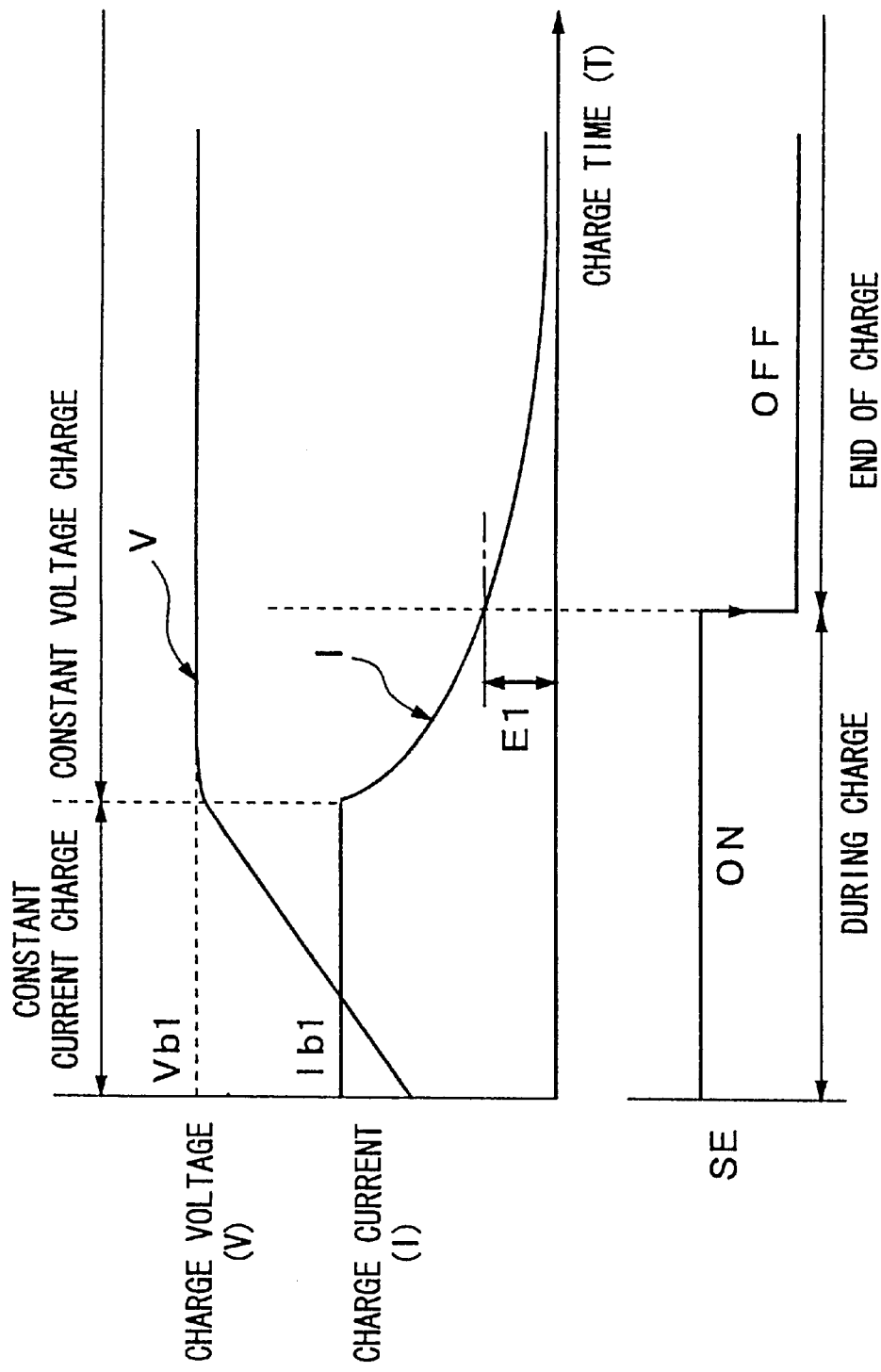

CHARGING APPARATUS

BACKGROUND OF THE INVENTION

1. Field of the Invention

The present invention relates to a charging apparatus for charging a secondary battery.

2. Description of the Related Art

In a charging apparatus which is used for charging a secondary battery such as a lithium battery or the like, a constant current charge and a constant voltage charge are generally executed.

The charging apparatus using such a charging method has a construction, for example, as shown in FIG. 10. FIG. 11 shows a relation (output characteristics of the charging apparatus) between a charge voltage V and a charge current I. FIG. 12 shows relations (charge characteristics curves) between the charge voltage V, charge current I and a charge time T.

In a charging apparatus 100, a secondary battery 101 and a current detecting resistor 102 are serially connected to a power source 103. That is, a positive terminal of the secondary battery 101 is connected to a positive terminal of the power source 103. A negative terminal of the secondary battery 101 is connected to one end of the current detecting resistor 102 and the other end of the current detecting resistor 102 is connected to a negative terminal of the power source 103. Positive and negative input terminals of a comparator 104 are connected to both ends of the current detecting resistor 102 and an output terminal of the comparator 104 is connected to the power source 103.

In such a construction, since a charge of a constant current Ib1 is finished and a charge of a constant voltage Vb1 is started at the end of the charge of the secondary battery 101, the charge current I is reduced. When the comparator 104 detects that the charge current I is equal to or less than a predetermined value E1, a generation of a charge continuation signal SE to the power source 103 is stopped, thereby finishing the charge. That is, the comparator 104 detects the voltage across the current detecting resistor 102, thereby detecting that the secondary battery 101 is fully charged.

As a foregoing current detecting resistor 102 of the charging apparatus 100, a resistor of a low resistance, for example, (R=0.1Ω) is used because of a reason of an electric power consumption or the like. However, since the charge current I at the end of the charge of the secondary battery 101 is a low current, for example, I=0.2A, a voltage which is detected by the comparator 104 is an extremely microscopic voltage as E1=I·R=20 mV. As a comparator 104 for detecting such a microscopic voltage, a high-precision comparator in which an offset voltage is extremely low has to be used, so that there is a drawback that it is expensive.

Even after completion of the charge, there is a case such that a capacity of the battery is reduced by a consumption in the battery, a consumption due to an impedance of the power source 103 when the apparatus is left in a stop state, a consumption, for example, in a portable telephone main body, or the like. Generally, when the charge is continued even after the end of the charge, the occurrence of the drop in the battery capacity can be also prevented. However, there is a problem such that when a voltage is continuously applied to the secondary battery 100, the life of the battery is shortened.

Further, when a plurality of, for example, two secondary batteries are connected in parallel and are charged by using the foregoing charging apparatus 100, if during the charge of one of the secondary batteries, the other secondary battery is connected, there is a problem such that there is a case where the charge is finished by an erroneous discrimination irrespective of a fact that one of the secondary batteries is being charged.

OBJECTS AND SUMMARY OF THE INVENTION

It is an object of the invention to provide a cheap charging apparatus which prevents the occurrence of a drop in a battery capacity without deteriorating a secondary battery.

Another object of the invention is to provide a charging apparatus which can prevent an erroneous discrimination about the end of a charge even if a plurality of secondary batteries are connected in parallel.

According to an aspect of the invention, there is provided a charging apparatus for controlling so as to charge a connected secondary battery by a constant current while a charge voltage increases until a charge voltage reaches a constant voltage and to charge the secondary battery by the constant voltage while a charge current decreases until a terminal voltage of the secondary battery rises to the constant voltage, comprising: switching means for shutting off the charge current at a certain period; comparing means for comparing a voltage difference between a first voltage on a power source side than the switching means when the charge current is shut off and a second voltage on the secondary battery side with a first reference voltage; and control means for stopping the charge or displaying an end of the charge in accordance with the comparison result.

According to another aspect of the invention, there is provided a charging apparatus for controlling so as to charge a plurality of secondary batteries which are connected in parallel by a constant current while a charge voltage increases until a charge voltage reaches a constant voltage and to charge the plurality of secondary batteries by the constant voltage while a charge current decreases until a terminal voltage of the secondary battery rises to the constant voltage, characterized by comprising: switching means for shutting off the charge current of one of the secondary batteries at a certain period; first comparing means for comparing a voltage difference of a first voltage on a power source side than the switching means when the charge current is shut off and a second voltage on the secondary battery side with a first reference voltage; second comparing means for comparing a negative terminal voltage of one of the secondary batteries with a second reference voltage; and control means for controlling the charge in accordance with each of the comparison results.

According to the above construction, since the charge is continued or stopped by comparing the charge voltage of the secondary battery and a predetermined reference voltage, the construction can be simplified and a -state of full charge can be always kept. According to the invention, the product costs can be reduced and a reliability of the charge can be increased. Since the current detecting resistor needed in the conventional apparatus is unnecessary, the number of parts can be reduced. The voltage drop occurring when the current flows in the current detecting resistor is eliminated. Thus, the charge time of the secondary battery can be shortened.

According to the above another construction, a direction of the charge current of the secondary battery which has already been charged is detected, when the direction of the charge current is reversed, the charge is stopped and the apparatus is waited, and when the direction of the charge current is again reversed, the charge is restarted, so that an erroneous discrimination about the end of the charge can be prevented. According to the invention, even if a plurality of secondary batteries are charged in parallel, an erroneous decision about the end of the charge can be prevented, so that the reliability of the charge can be raised and the rapid deterioration of the secondary battery can be prevented.

The above and other objects and features of the present invention will become apparent from the following detailed description and the appended claims with reference to the accompanying drawings.

BRIEF DESCRIPTION OF THE DRAWINGS

FIG. 12 is a diagram showing the relations (charge characteristics curves) among charge voltage • current and a charge time of the charging apparatus shown in FIG. 7.

DETAILED DESCRIPTION OF THE PREFERRED EMBODIMENT

A preferred embodiment of the invention will be described in detail hereinbelow with reference to the attached drawings.

Since the embodiment which will be described hereinbelow is a preferred specific example of the invention, various limitations which are technically preferable are given. However, the scope of the invention is not limited to those embodiments as long as there is particularly no disclosure to limit the invention in the following description.

Figure 1:
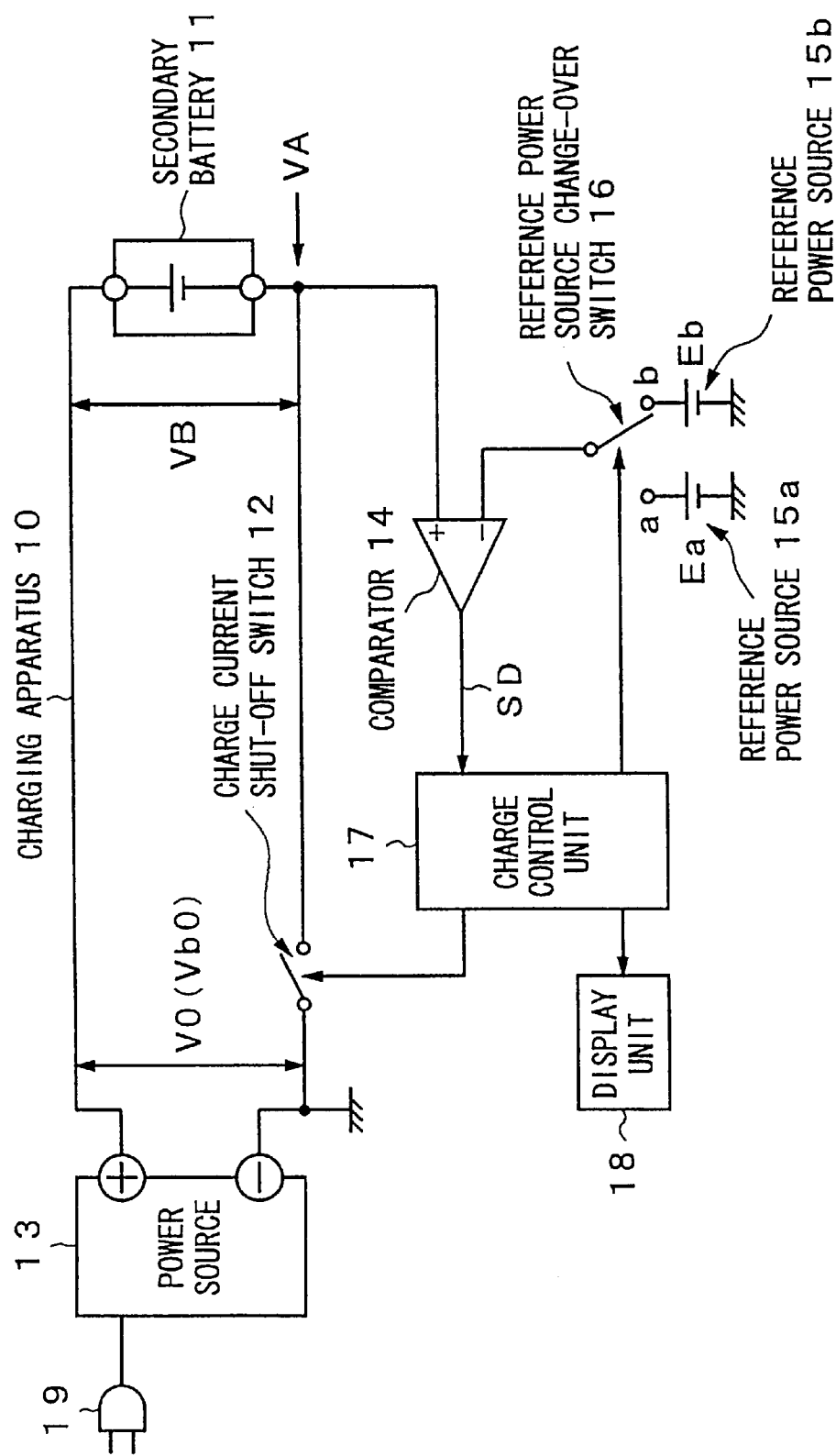
FIG. 1 is a block diagram for showing a first embodiment of a charging apparatus of the invention.

FIG. 1 is a constructional diagram showing a first embodiment of a charging apparatus of the invention.

In a charging apparatus 10, a secondary battery 11 and a charge current shut-off switch 12 are serially connected to a power source 13. That is, a positive terminal of the secondary battery 11 is connected to a positive terminal of the power source 13. A negative terminal of the secondary battery 11 is connected to one end of the charge current shut-off switch 12 and the other end of the charge current shut-off switch 12 is connected to a negative terminal of the power source 13. Further, the negative terminal of the secondary battery 11 is connected to a positive input terminal of a comparator 14. A terminal of a reference power source change-over switch 16 of reference power sources 15a and 15b is connected to a negative input terminal of the comparator 14. An output terminal of the comparator 14 is connected to a charge control unit 17. The charge control unit 17, charge current shut-off switch 12, reference power source change-over switch 16, and a display unit 18 are connected.

Figure 2:
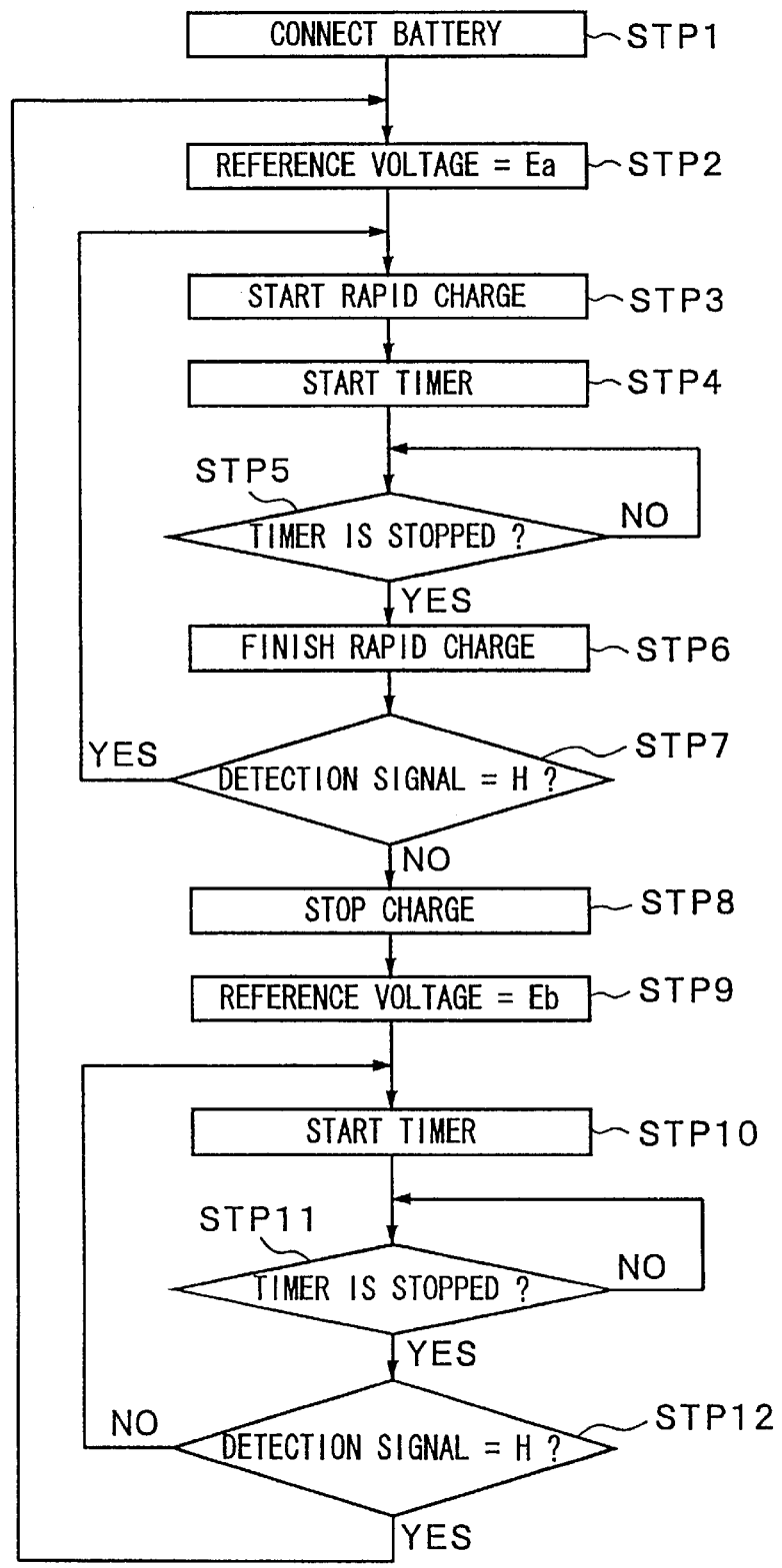
FIG. 2 is a flowchart for explaining an operation example of the charging apparatus shown in FIG. 1.

In such a construction, an operation example of the charge will be first described with reference to a flowchart of FIG. 2.

First, an output voltage VO of the power source 13 is adjusted and set so as to be equal to a full charge voltage Vb0 (refer to FIG. 3) of the secondary battery 11, for example, 8.4V in a state (no load state) in which the secondary battery 11 is not connected. An AC connector 19 is connected to an AC power source (AC 100V) and the secondary battery 11 is connected (step STP1).

The charge control unit 17 operates the reference power source change-over switch 16 so as to be switched to, for instance, a contact (a) side of the reference power source 15a (step STP2). The charge control unit 17 starts a rapid charge and also starts a timer (steps STP3, 4) and finishes the rapid charge when the timer stops (steps STP5, 6). That is, the charge control unit 17 controls the on/off of charge current shut-off switch 12 at a predetermined period or an arbitrary period after the start of the rapid charge. For example, the charge current shut-off switch 12 is turned on for only three minutes after the start of the rapid charge, thereby supplying the charge current. After the elapse of three minutes, the charge current shut-off switch 12 is turned off, thereby shutting off the charge current.

The comparator 14 compares a voltage difference VA between the output voltage V0 of the power source 13 at the time of no load which is supplied to the positive input terminal when the charge current is shut off and an open battery voltage VB with a reference voltage Ea of the reference power source 15a which is supplied to the negative input terminal, thereby detecting a voltage $\Delta V$ across the charge current shut-off switch 12 and generating a detection signal SD to the charge control unit 17.

When the detection signal SD is at the high level, the charge control unit 17 determines that the charge is continued, allows the display unit 18 to display "in charge", returns to step STP3, and repeats the above-mentioned processes (step STP7). When the detection signal SD is at the low level, the charge control unit 17 decides that the charge has been stopped and allows the display unit 18 to display "charge stop", thereby stopping the charge (step STP8).

The processes up to the above steps relate to the example of the charging operation.

Figure 3:
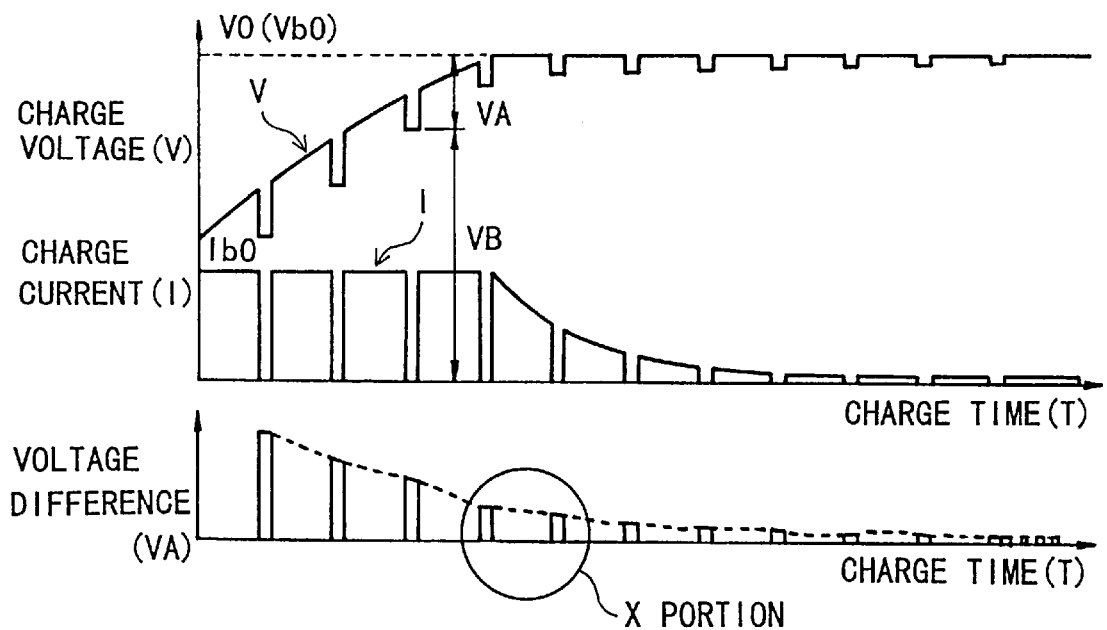
FIG. 3 is a first diagram showing the relations (charge characteristics curves) among charge voltage • current and charge time of the charging apparatus shown in FIG. 1.
Figure 4:
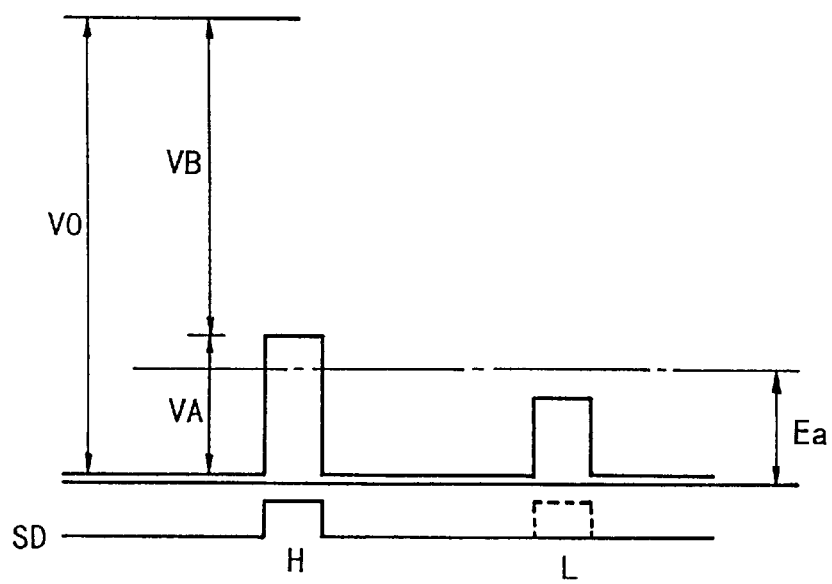
FIG. 4 is an enlarged diagram of an X portion shown in FIG. 3.
Figure 11:
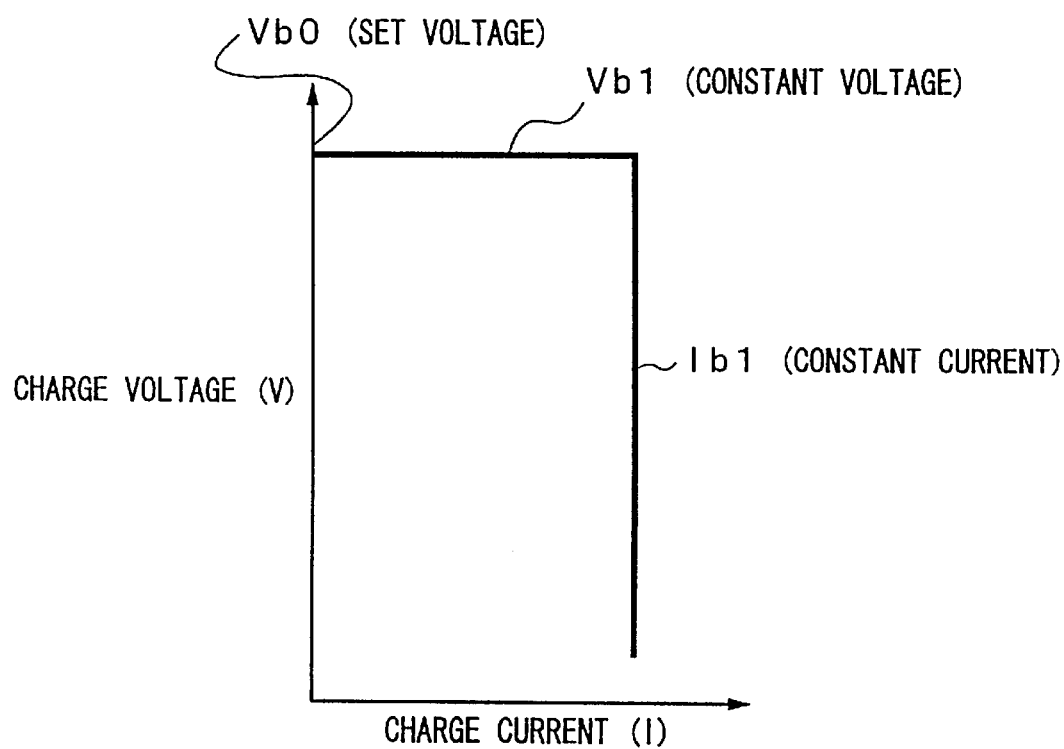
FIG. 11 is a diagram showing the relation (output characteristics of the charging apparatus) between a general output voltage and a charge current.

FIG. 3 is a diagram showing relations (charge characteristics curves) among the charge voltage V • charge current I of the charging apparatus 10, the voltage difference VA, and the charge time T. FIG. 4 is an enlarged diagram of an X portion in FIG. 3. A relation (output characteristics of the charging apparatus) between the charge voltage V and the charge current I is similar to that of FIG. 11.

In the shut-off period of the charge current I (period in which the charge voltage V drops), the voltage difference VA between the output voltage VO of the power source 13 at the time of no load and the open battery voltage VB is supplied to the comparator 14 and is compared with the reference voltage Ea of the reference power source 15a. The voltage ΔV across the charge current shut-off switch 12 is detected and the detection signal SD is outputted to the charge control unit 17. When the detection signal SD is at the low level, that is, when the voltage difference VA is equal to or less than the reference voltage Ea, the charge is stopped.

The output of the detection signal SD of the comparator 14 is valid only in the shut-off period of the charge current I and it is determined as an invalid detection for a period of time except such a period.

Therefore, the output of the detection signal SD in the period in which the charge current I is not shut off is at the high or low level depending on a circuit setting.

In the construction as mentioned above, the voltage ΔV is set to, for example, 80 mV. As a comparator 14 for detecting the voltage ΔV of 80 mV, even if a voltage of about 5 mV as a variation of an offset voltage is considered, it is a non-problematic level, so that a general IC can be used. Since the charge control unit 17 does not affect a high-accurate analog voltage, a cheap IC of 1 k ROM or less such as logic circuit, one-chip microcomputer, or the like can be used.

An operation example of a re-charge after the stop of the charge will now be described with reference to the flowchart of FIG. 2.

When the charge of the secondary battery 11 is stopped (step STP8), the charge control unit 17 operates the reference power source change-over switch 16, thereby switching to, for example, a contact (b) side of the reference power source 15b (step STP9). A reference voltage Eb of the reference power source 15b and the reference voltage Ea of the reference voltage 15a are set as Eb (for example, 120 mV)>Ea (for example, 80 mV).

The charge control unit 17 starts the timer (step STP10). When the timer stops (step STP11), the comparator 14 compares the voltage difference VA between the output voltage VO of the power source 13 at the time of no load which is supplied to the positive input terminal and the open battery voltage VB with the reference voltage Eb of the reference power source 15b which is supplied to the negative input terminal, thereby detecting the voltage ΔV across the charge current shut-off switch 12 in the same period as that in steps STP4 and STP5. The detection signal SD is transmitted to the charge control unit 17.

When the detection signal SD is at the high level, the charge control unit 17 decides that the charge is again executed, allows the display unit 18 to display "in re-charge", returns to step STP2, and repeats the above-mentioned processes (step STP12). When the detection signal SD is at the low level, the charge control unit 17 determines that the charge stop state continues, allows the display unit 18 to continuously display "charge stop", returns to step STP10, and repeats the above-mentioned processes. When it is set that the comparing process of the comparator 14 is continued even after the stop of the charge, the timer process (steps STP10, 11) of the charge control unit 17 can be omitted.

The above steps relate to the example of the re-charging operation.

Figure 5:
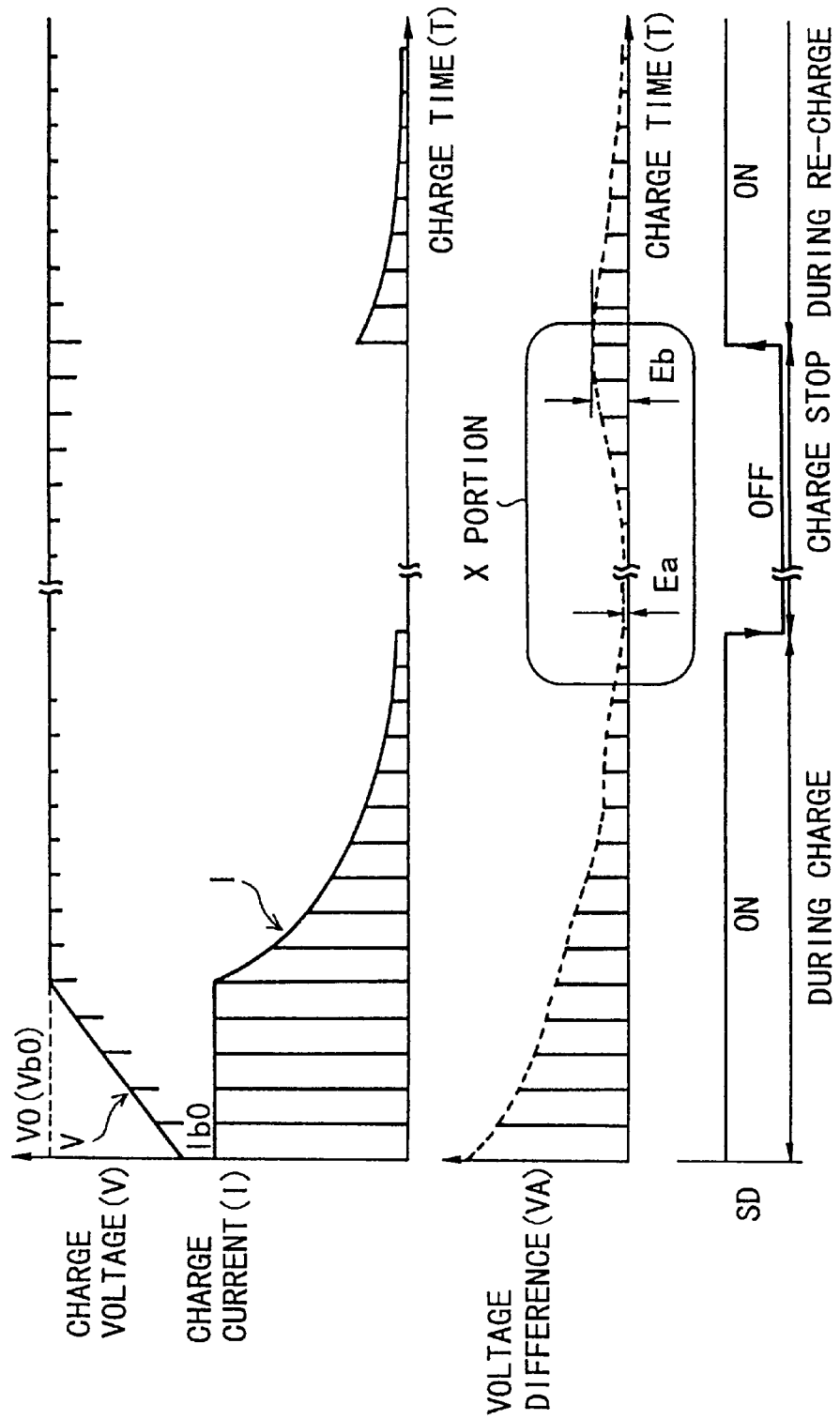
FIG. 5 is a second diagram showing the relations (charge characteristics curves) among the charge voltage • current and the charge time of the charging apparatus shown in FIG. 1.
Figure 6:
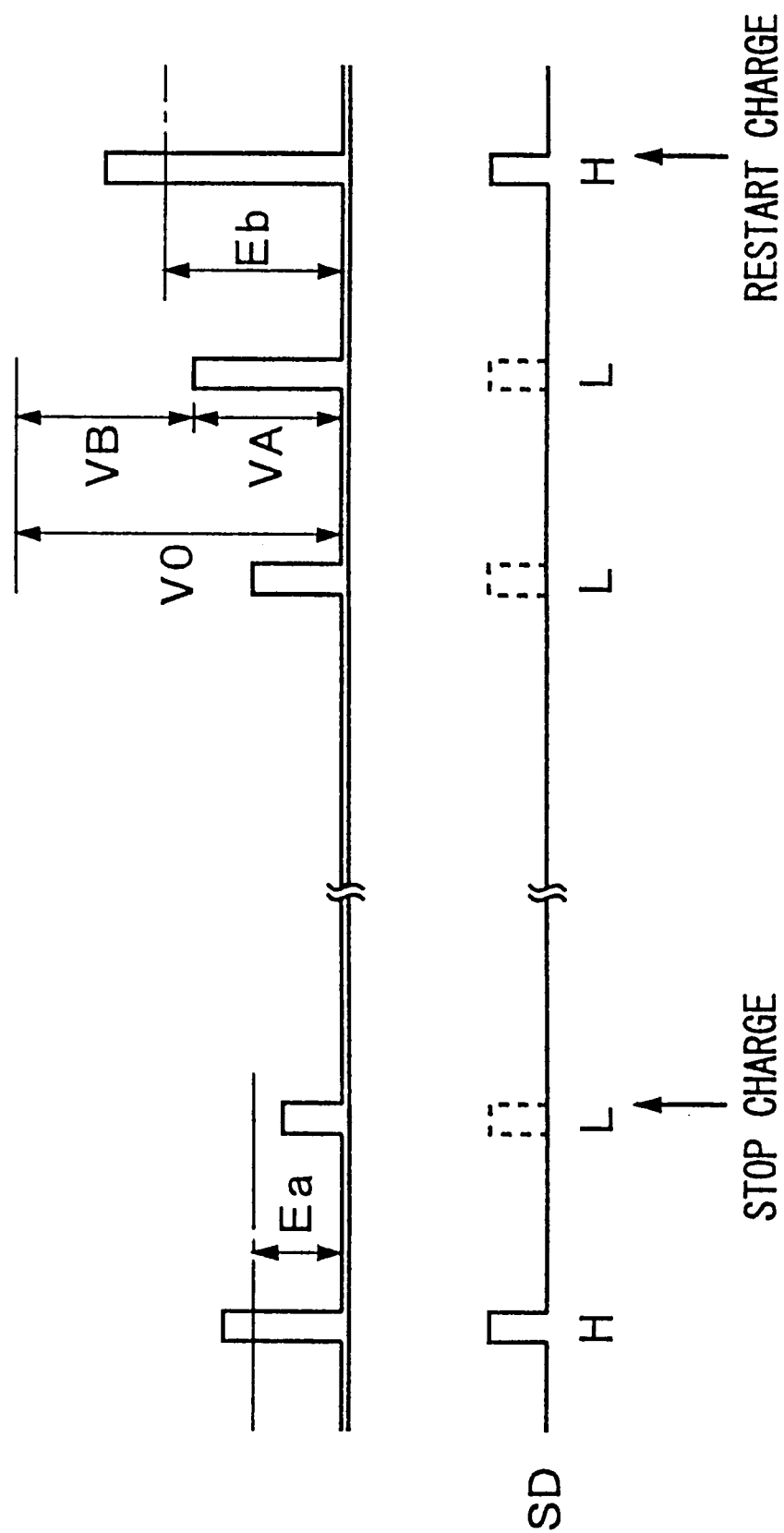
FIG. 6 is an enlarged diagram of an X portion shown in FIG. 5.

FIG. 5 is a diagram showing relations (charge characteristics curves) among the charge voltage • current and the charge time of the charging apparatus 10. FIG. 6 is an enlarged diagram of an X portion in FIG. 5.

When the battery capacity decreases after the stop of the charge, the voltage difference VA rises as compared with that at the time of the charge stop. Consequently, after a predetermined time elapsed after the stop of the charge, the voltage difference VA between the output voltage VO of the power source 13 at the time of no load and the open battery voltage VB is inputted to the comparator 14 at a Predetermined period and is compared with the reference voltage Eb of the reference voltage 15b, thereby detecting the voltage ΔV across the charge current shut-off switch 12. The detection signal SD is outputted to the charge control unit 17. When the detection signal SD is at the high level, namely, when the voltage difference VA is equal to or higher than the reference voltage Eb, the recharge is started.

As mentioned above, in the charging apparatus 10, since a general comparator can be used to detect the voltage and a general microcomputer can be used to control the charge, the costs of the apparatus itself can be reduced. The charge is continued until the voltage difference VA is set to the reference voltage Ea after the start of the charge. Further, when the voltage difference VA is set to the reference voltage Eb after the stop of the charge, the recharge is started. Consequently, the life of the secondary battery 11 is not deteriorated and the full charge state can be always kept.

Although the two reference power sources are set and the charge stop and the re-charge start are detected in the above-mentioned first embodiment, only in-charge/end of charge can be also displayed (the charge current is continuously supplied). By setting a plurality of reference power sources, for example, a charge amount can be also detected by switching a display during the charge.

Figure 7:
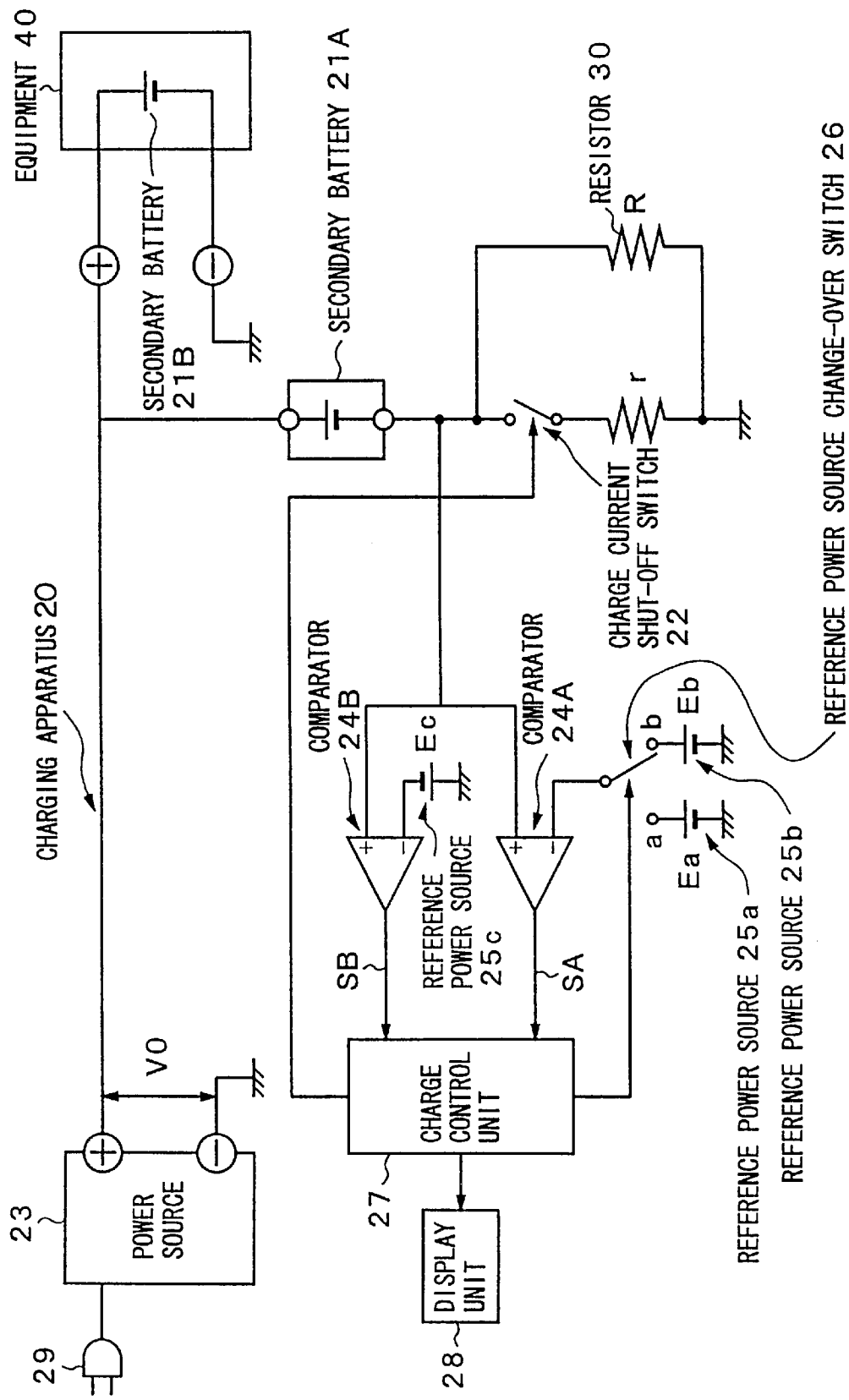
FIG. 7 is a block diagram showing a second embodiment of a charging apparatus of the invention.

FIG. 7 is a constructional diagram showing a second embodiment of a charging apparatus of the invention. In the embodiment, as a charging apparatus which can charge a plurality of secondary batteries in parallel, a charging apparatus equipped to connect secondary battery and an equipment or the like such as a portable telephone or the like having therein a secondary battery to an output terminal and charge the plurality of secondary batteries will be described.

In a charging apparatus 20, a secondary battery 21A and a charge current shut-off switch 22 are serially connected to a power source 23. Further, a secondary battery 21B built in an equipment 40 such as a portable telephone or the like is connected in parallel with the secondary battery 21A through an output terminal. That is, positive terminals of the secondary batteries 21A and 21B are connected to a positive terminal of the power source 23, a negative terminal of the secondary battery 21A is connected to one end of the charge current shut-off switch 22. The other end of the charge current shut-off switch 22, a negative terminal of the secondary battery 21B, and a negative terminal of the power source 23 are connected to the ground. A resistor 30 is connected in parallel with the charge current shut-off switch 22.

The negative terminal of the secondary battery 21A is connected in parallel with positive input terminals of comparators 24A and 24B. A terminal of a reference power-source change-over switch 26 of reference power sources 25a and 25b is connected to a negative input terminal of the comparator 24A. An output terminal of the comparator 24A is connected to a charge control unit 27. Further, a negative terminal of a reference power source 25c is connected to a negative input terminal of the comparator 24B. An output terminal of the comparator 24B is connected to the charge control unit 27. The charge current shut-off switch 22, reference power source change-over switch 26, and a display unit 28 are connected to the charge control unit 27.

In case of charging two secondary batteries in parallel, their battery voltages are ordinarily different. Therefore, the charging apparatus doesn't charge the secondary battery of a high battery voltage but charges only the secondary battery of a low battery voltage. For example, when the un-charged secondary battery 21B is connected at a timing shown in FIG. 9 while the secondary battery 21A is charged by a charge voltage V0A, the charge voltage is set to V0B. Now, assuming that the charge voltage V0B is lower than the charge voltage V0A, the charge of the secondary battery 21A is shut off in the middle of the charge and a current reversely flows from the secondary battery 21A to the secondary battery 21B.

In such a situation, if the comparator 24A is constructed so as to detect a voltage ΔV across the charge current shut-off switch 22, in spite of a fact that the secondary battery 21A is being charged, the comparator 24A detects the end of charge of the secondary battery 21A and an erroneous decision indicative of the end of charge is displayed on the display unit 28. Therefore, the comparator 24B is constructed so as to compare the voltage at the negative terminal of the secondary battery 21A with a grounding voltage and to detect a reverse current from the secondary battery 21A to the secondary battery 21B.

Figure 8:
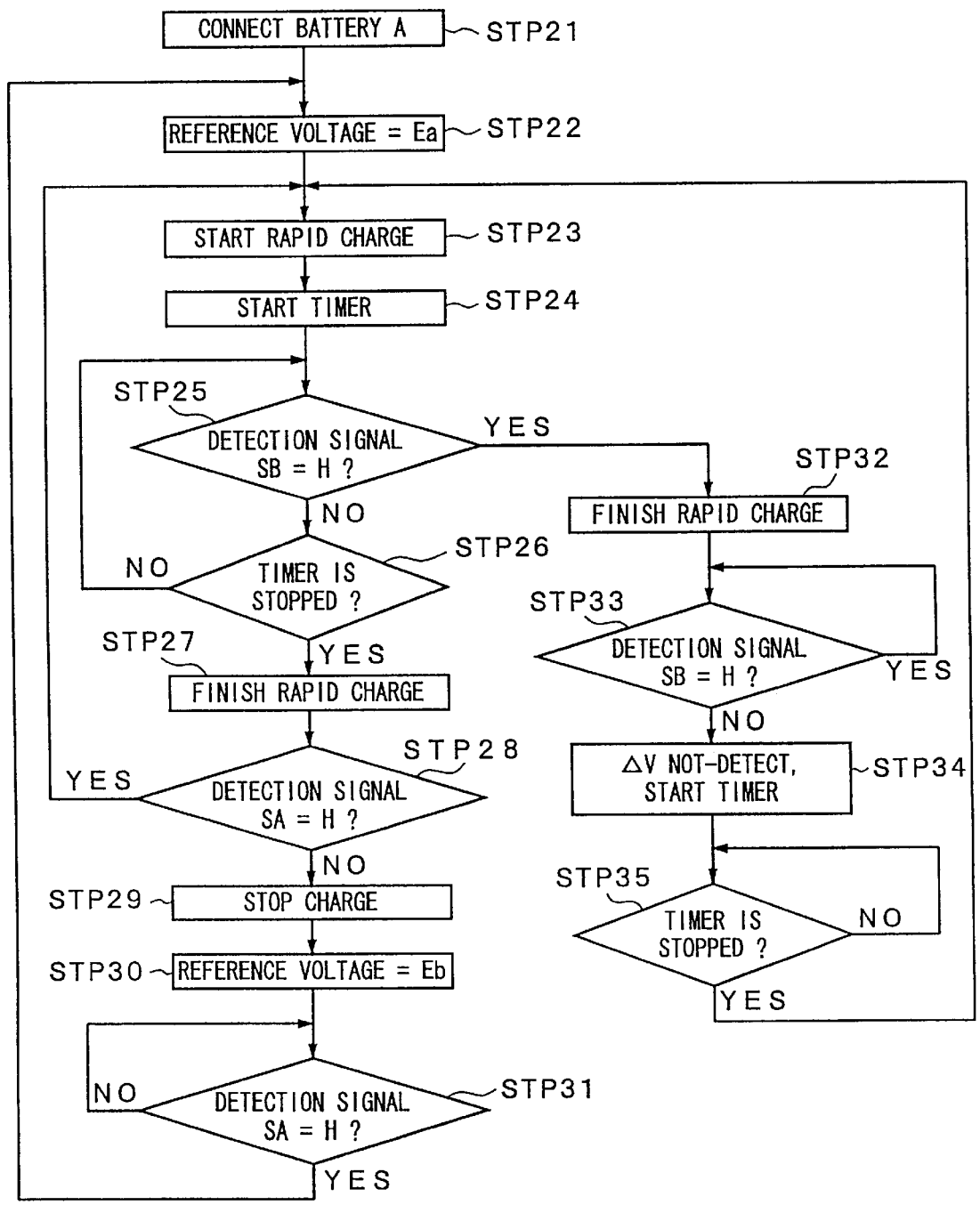
FIG. 8 is a flowchart for explaining an operation example of the charging apparatus shown in FIG. 7.

In such a construction, an example of the charging operation will now be described with reference to a flowchart of FIG. 8.

First, in a state (at the time of no load) where the secondary batteries 21A and 21B are not connected, an output voltage V0 of the power source 23 is adjusted and set so as to become a full charge voltage Vb0 (refer to FIG. 9) of the secondary batteries 21A and 21B, for example, 8.4V. An AC connector 29 is connected to an AC power source (AC 100V) and the secondary battery 21A is connected (step STP21).

The charge control unit 27 operates the reference power source change-over switch 26, thereby switching to, for example, a contact (a) side of the reference power source 25a (step STP22). The charge control unit 27 starts a rapid charge and also starts a timer (steps STP23, 24). The comparator 24B detects whether the voltage at the negative terminal of the secondary battery 21A is lower than a grounding voltage or not, and generates a detection signal SB to the charge control unit 27.

When the detection signal SB is at the low level, namely, when the voltage at the negative terminal of the secondary battery 21A is higher than the grounding voltage, the charge control unit 27 finishes the rapid charge when the timer stops (steps STP25, 26, 27). Namely, the charge control unit 27 controls the on/off charge current shut-off switch 22 at a predetermined period or an arbitrary period after the start of the rapid charge. For example, the charge control unit 27 turns on the charge current shut-off switch 22 only for three minutes after the start of the rapid charge, supplies a charge current, and after the elapse of three minutes, turns off the charge current shut-off switch 22, and shuts off the charge current.

The comparator 24A compares a voltage difference VA between the output voltage V0 of the power source 23 at the time of no load which is inputted to the positive input terminal when the charge current is shut off and an open battery voltage VB with a reference voltage Ea of the reference power source 25a which is inputted to the negative input terminal, detects the voltage ΔV across the charge current shut-off switch 22, and generates a detection signal SA to the charge control unit 27.

When the detection signal SA is at the high level, the charge control unit 27 determines a charge continuation, and allows the display unit 28 to display "in charge", returns to step STP3, and repeats the foregoing processes (step STP28). When the detection signal SA is at the low level, the charge control unit 27 determines the charge stop, allows the display unit 28 to display "charge stop", and stops the charge (step STP29).

When the charge of the secondary battery 21A is stopped (step STP29), the charge control unit 27 operates the reference power source change-over switch 26, thereby switching to, for example, a contact (b) side of the reference power source 25b (step STP30). A reference voltage Eb of the reference power source 25b and the reference voltage Ea of the reference power source 25a are set so as to be Eb (for example, 120 mV)>Ea (for example, 80 mV).

The comparator 24A compares the voltage difference VA between the output voltage V0 of the power source 23 at the time of no load which is inputted to the positive input terminal and the open battery voltage VB with the reference voltage Eb of the reference power source 25b which is inputted to the negative input terminal, detects the voltage ΔV across the charge current shut-off switch 22 at the same period as that in steps STP24, STP25, and STP26 mentioned above, and transmits the detection signal SA to the charge control unit 27.

When the detection signal SA is at the high level, the charge control unit 27 determines "re-charge", allows the display unit 28 to display "in re-charge", returns to step STP22, and repeats the foregoing processes (STP31).

When the secondary battery 21B is connected during the processes in steps STP23 to STP28, the comparator 24B inputs a voltage (voltage lower than a reference voltage Ec of the reference power source 25c) at the negative terminal of the secondary battery 21A which is lower than the grounding voltage by an impedance resistor r of the charge current shut-off switch 22, so that it generates the detection signal SB at the high level to the charge control unit 27.

When the detection signal SB at the high level is received, the charge control unit 27 determines that the current reversely flows from the secondary battery 21A to the secondary battery 21B, and immediately finishes the rapid charge (steps STP25, 32). Namely, the charge control unit 27 turns off the charge current shut-off switch 22. Thus, the reverse current passes through the resistor 30 and reversely flows.

When the rapid charge is finished in step STP12, the charge control unit 27 discriminates by the detection signal SB whether the reverse current through the resistor 30 continues or not (step STP33). When the detection signal SB is set to the low level, a ΔV non-detection timer is started and the detection of the voltage ΔV across the charge current shut-off switch 22 of the comparator 24A is temporarily stopped (step STP34). When the ΔV non-detection timer is stopped, the charge control unit 27 restarts the detection of the voltage ΔV across the charge current shut-off switch 22 of the comparator 24A, returns to step STP23, and repeats the foregoing processes (step STP35).

So long as the detection signal SB at the high level is inputted from the comparator 24B to the charge control unit 27, or when the ΔV non-detection timer is operating, the charge current shut-off switch 22 is turned off. However, by continuing the display "in-charge" of the display unit 28 for such a period of time, an erroneous decision of the end of charge can be prevented.

Figure 9:
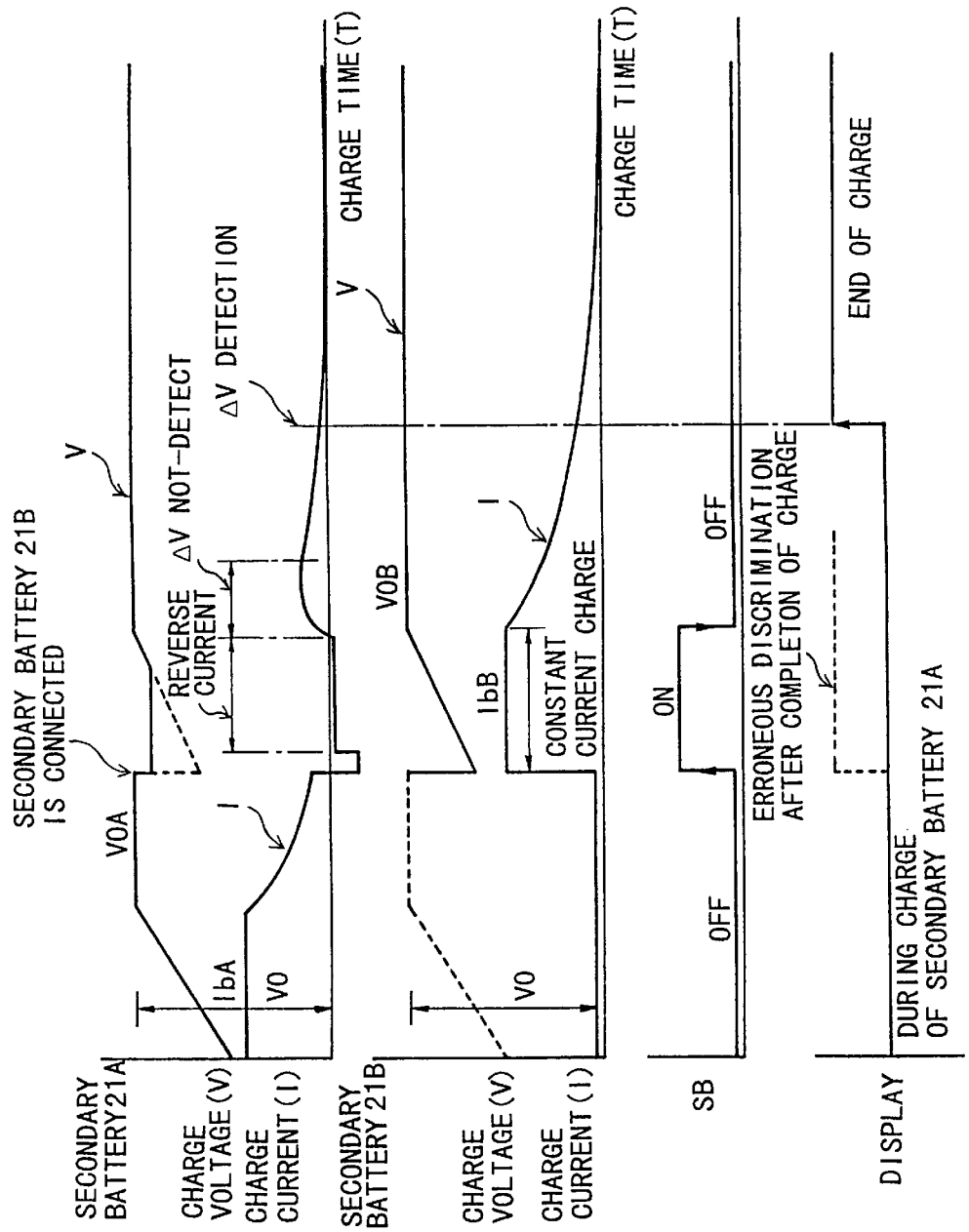
FIG. 9 is a diagram showing the relations (charge characteristics curves) among charge voltage • current and a charge time of the charging apparatus shown in FIG. 7.
Figure 10:
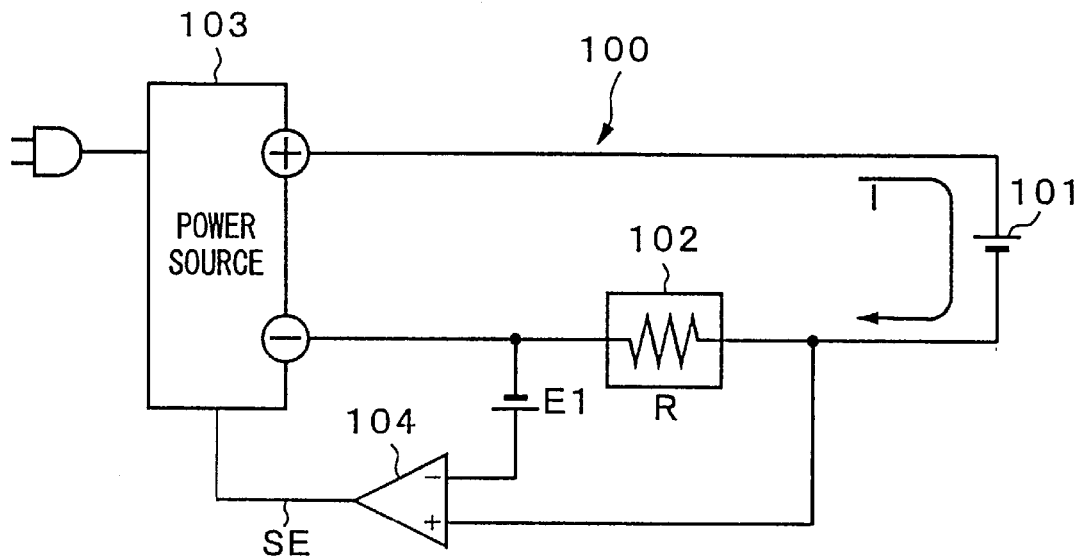
FIG. 10 is a block diagram showing an example of a conventional charging apparatus.

FIG. 9 is a diagram showing relations (charging characteristics curves) among the charge voltage V • charge current I, the voltage difference VA, and the charge time T of each of the secondary batteries 21A and 21B in the charging apparatus 20. A relation (output characteristics of the charging apparatus) between the charge voltage V and the charge current I is similar to that of FIG. 11.

As mentioned above, when the secondary battery 21B is connected during the charge of the secondary battery 21A, the current reversely flows from the secondary battery 21A to the secondary battery 21B. However, the reverse current is set to Ec/r=0.2A when it is assumed that the impedance resistance r of the charge current shut-off switch 22 is equal to 50 mΩ and the reference voltage Ec of the reference power source 25c is equal to 10 mV. Therefore, the comparator 24B can detect the generation of the reverse current of 0.2A or more. When the reference voltage Ec of the reference power source 25c is further reduced, the generation of a further small reverse current can be detected.

Further, the reverse current after the charge current shut-off switch 22 was turned off reversely flows in the resistor 30. However, now assuming that a resistance R of the resistor 30 is equal to 100 Ω, the reverse current is set to Ec/R=0.1 mA and the switch is switched so that the reverse current from the secondary battery 21A can be detected by a micro current. As mentioned above, by turning off the charge current shut-off switch 22, the reverse current can be minimized.

When the switch is switched to the charge of the secondary battery 21B, the charge voltage V0B rises. When the charge voltage V0B reaches V0, a charge current IbB decreases (constant voltage charge). On the other hand, since the charge voltage is reduced to V0, a charge current IbA starts to flow in the secondary battery 21A. The charge current IbA rises to the current value which was shut off by the connection of the secondary battery 21B and starts to decrease after that (parallel charging state). The charge current IbA is determined by the charge time of the secondary battery 21B for a period of time during which the switch is switched from the reverse current to the actual charge and the current reaches the peak of the charge current IbA. Therefore, the ΔV non-detection timer is activated in a manner such that even after the detection signal SB at the high level of the comparator 24B was released, the charge stop state is not immediately cancelled. Although there is no problem if the ΔV non-detection period coincides with the constant current charging period of time of the secondary battery 21B, it can be also set by experiments and examination.

In the above construction, the voltage ΔV is set to, for instance, 80 mV. However, the comparator 24A to detect the voltage ΔV of 80 mV is particularly at the nonproblematic level even if a voltage of about 5 mV as a variation of an offset voltage is considered, so that a general IC can be used. Since the charge control unit 27 doesn't detect a high-accurate analog voltage, for example, a cheap IC of 1 k ROM or less such as logic circuit, one-chip microcomputer, or the like can be use.

As mentioned above, since the charging apparatus 20 can use a general comparator to detect a voltage and can use a general microcomputer to control the charge, the apparatus itself can be made cheap. The charge is continued until the voltage difference VA reaches the reference voltage Ea after the start of the charge. Further, after the charge was stopped, when the voltage difference VA reaches the reference voltage Eb, the re-charge is started. Therefore, the deterioration in life of the secondary battery 21A doesn't occur and the full charging state can be always held.

Although the above embodiment has been described with respect to the parallel charge of two secondary batteries, even in case of charging in parallel a plurality of (three or more) secondary batteries, by providing the foregoing reverse current detecting means for each of the secondary batteries, a similar effect can be obtained.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A charging apparatus for controlling so as to charge a plurality of secondary batteries which are connected in parallel, said charging apparatus comprising:

a power source for supplying a charging current to said plurality of secondary batteries;

switching means for shutting off the charge current of one of said secondary batteries at a certain period;

first comparing means for comparing a voltage difference of a first voltage of said power source when said charge current is shut off and a second voltage of said secondary battery with a first reference voltage;

second comparing means for comparing a negative terminal voltage of one of said secondary batteries with a second reference voltage; and control means for controlling the charge in accordance with each of said comparison results.

2. A charging apparatus according to claim 1, wherein the charge of one of said secondary batteries is stopped when the negative terminal voltage of one of said secondary batteries is equal to or less than said second reference voltage.

3. A charging apparatus according to claim 1, wherein an operation of said first comparing means is stopped for a predetermined period of time from a timing when the negative terminal voltage of one of said secondary batteries is equal to or higher than said second reference voltage.

4. A charging method of controlling so as to charge a plurality of secondary batteries which are connected in parallel, said method comprising:

a switching step of shutting off the charge current of one of said secondary batteries at a certain period by a switching means;

a first comparing step of comparing a voltage difference of a first voltage of a power source when said charge current is shut off and a second voltage of said secondary battery with a first reference voltage;

a second comparing step of comparing a negative terminal voltage of one of said secondary batteries with a second reference voltage; and a control step of controlling the charge in accordance with each of said comparison results obtained in said first and second comparing steps.

5. A charging method according to claim 4, wherein the charge of one of said secondary batteries is stopped when the negative terminal voltage of one of said secondary batteries is equal to or less than said second reference voltage.

6. A charging method according to claim 4, wherein an operation in said first comparing step is stopped for a predetermined period of time from a timing when the negative terminal voltage of one of said secondary batteries is equal to or higher than said second reference voltage.

7. A charging apparatus for controlling so as to charge a connected secondary battery, said charging apparatus comprising:

a power source for supplying a charging current to said secondary battery;

first switching means for shutting off a charge current at a certain period;

comparing means for comparing a voltage difference between a first voltage of said power source when said charge current is shut off and a second voltage of said secondary battery with a first or a second reference voltage;

second switching means for connecting one of said first or said second reference voltage with said comparing means, wherein said second switching means either connects said first reference voltage during the charge of said secondary battery or connects said second reference voltage after the charge is stopped; and control means for controlling the charging of said second battery, wherein said control means stops the charge or displays an end of the charge in accordance with said first comparison result and starts a recharge in accordance with said second comparison result.

8. A charging apparatus according to claim 7, wherein when said voltage difference is equal to or less than said first reference voltage, the charge is stopped or the end of the charge is displayed.

9. A charging apparatus according to claim 7, wherein when said voltage difference is equal to or higher than said second reference voltage, the recharge is started.

10. A charging method of controlling so as to charge a connected secondary battery, said method comprising the steps of:

a switching step of shutting off a charge current at a certain period by switching means;

a first comparing step of comparing a voltage difference between a first voltage of a power when said charge current is shut off and a second voltage of said secondary battery with a first reference voltage;

a second comparing of step comparing a voltage difference between said first voltage of a power source when said charge current is shut off and said second voltage of said secondary battery with a second reference voltage after an elapse of a predetermined time from the stop of the charge; and a control step of controlling the charge in accordance with each of said comparison results obtained in said first and second comparing steps.

11. A charging method according to claim 10, wherein when said voltage difference is equal to or less than said first reference voltage in accordance with said first comparison, the charge is stopped or the end of the charge is displayed.

12. A charging method according to claim 10, wherein when said voltage difference is equal to or higher than said second reference voltage in accordance with said second comparison, the recharge is started.

13. A charging apparatus for controlling so as to charge a plurality of secondary batteries which are connected in parallel, said charging apparatus comprising:

a power source for supplying a charging current to said plurality of secondary batteries;

first switching means for shutting off the charge current of one of said secondary batteries at a certain period;

first comparing means for comparing a voltage difference of a first voltage of said power source when said charge current is shut off and a second voltage of said secondary battery with a first or a second reference voltage;

second comparing means for comparing a negative terminal voltage of one of said secondary batteries with a third reference voltage;

second switching means for connecting one of said first or said second reference voltage with said first comparing means, wherein said second switching means either connects said first reference voltage during the charge of said secondary battery or connects said second reference voltage after the charge is stopped; and control means for controlling the charging of said second battery, wherein said control means stops the charge or displays an end of the charge in accordance with the first comparison result from said first comparing means and said second comparing means and starts a recharge in accordance with the second comparison result from said first comparing means.

14. A charging apparatus according to claim 13, wherein the charge of one of said secondary batteries is stopped when the negative terminal voltage of one of said secondary batteries is equal to or less than said third reference voltage.

15. A charging apparatus according to claim 13, wherein an operation of said first comparing means is stopped for a predetermined period of time from a timing when the negative terminal voltage of one of said secondary batteries is equal to or higher than said third reference voltage.

16. A charging method of controlling so as to charge a plurality of secondary batteries which are connected in parallel, said method comprising:

a switching step of shutting off the charge current of one of said secondary batteries at a certain period by switching means;

a first comparing step of comparing a voltage difference of a first voltage of a power source when said charge current is shut off and a second voltage of said secondary battery with a first reference voltage;

a second comparing step of comparing a negative terminal voltage of one of said secondary batteries with a second reference voltage;

a third comparing step of comparing a voltage difference between said first voltage of a power source when said charge current is shut off and said second voltage of said secondary battery with a third reference voltage after an elapse of a predetermined time from the stop of the charge; and a control step of controlling the charge in accordance with each of said comparison results obtained in said first, second, and third comparing steps.

17. A charging method according to claim 16, wherein the charge of one of said secondary batteries is stopped when the negative terminal voltage of one of said secondary batteries is equal to or less than said second reference voltage.

18. A charging method according to claim 16, wherein an operation in said first comparing step is stopped for a predetermined period of time from a timing when the negative terminal voltage of one of said secondary batteries is equal to or higher than said second reference voltage.

19. A charging apparatus according to claim 16, wherein when said voltage difference is equal to or higher than said third reference voltage in accordance with said third comparison, the recharge is started.

* * * * *